(12) United States Patent
Belwafa et al.

(10) Patent No.: US 7,488,022 B2
(45) Date of Patent: Feb. 10, 2009

(54) UNIVERSAL STRUCTURAL JOINT FOR AUTOMOTIVE FRAMES

(75) Inventors: Jamel Belwafa, Ann Arbor, MI (US); Bahig Fileta, Novi, MI (US); Saied Nusier, Canton, MI (US); Hikmat Mahmood, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/650,749

(22) Filed: Jan. 8, 2007

(65) Prior Publication Data

US 2008/0164707 A1  Jul. 10, 2008

(51) Int. Cl.
*B60J 7/00* (2006.01)
(52) U.S. Cl. ............... 296/29; 296/187.13; 296/193.06; 296/205
(58) Field of Classification Search .................. 296/29, 296/30, 187.13, 193.06, 193.12, 203.01, 296/205
See application file for complete search history.

(56) References Cited

U.S. PATENT DOCUMENTS

| 4,355,844 | A | | 10/1982 | Muzzarelli | 296/205 |
|---|---|---|---|---|---|
| 4,618,163 | A | | 10/1986 | Hasler | 280/785 |
| 4,660,345 | A | | 4/1987 | Browning | 82/648 |
| 4,986,597 | A | * | 1/1991 | Clausen | 296/205 |
| 5,332,281 | A | * | 7/1994 | Janotik et al. | 296/209 |
| 5,382,071 | A | * | 1/1995 | Enning et al. | 296/203.03 |
| 5,549,352 | A | * | 8/1996 | Janotik et al. | 296/209 |
| 5,634,663 | A | * | 6/1997 | Krupp et al. | 280/800 |
| 5,715,643 | A | | 2/1998 | Parkinson | 82/656.9 |
| 6,022,070 | A | * | 2/2000 | Ashina et al. | 296/205 |
| 6,623,067 | B2 | * | 9/2003 | Gabbianelli et al. | 296/205 |

* cited by examiner

*Primary Examiner*—Joseph D Pape
(74) *Attorney, Agent, or Firm*—Gregory Brown; Miller Law Group, PLLC

(57) ABSTRACT

A structural joint configuration is formed in an automotive frame in which the frame members are bent into an angular orientation and joined together to form a structural joint in the automotive frame in which loads imposed on any of the frame members forming the joint will be transferred to and shared with the other frame members in the joint. The structural joint can be configured with as many legs as needed to conform to the number of frame members entering the joint. The frame members can be formed with any cross-sectional shape and from any conventional material or combination of materials. Joining the frame members at the structural joint can be accomplished by welding or by applying adhesives. Load distribution through the frame members forming the structural joint enables the joint to withstand an application of high loads without major cracks or bending at the structural joint.

20 Claims, 6 Drawing Sheets

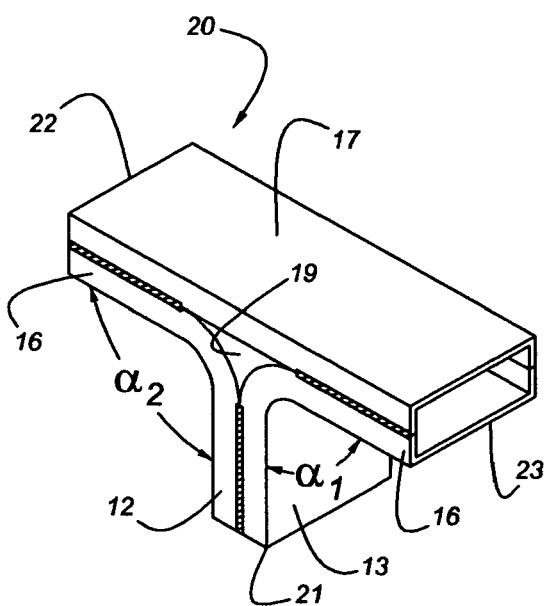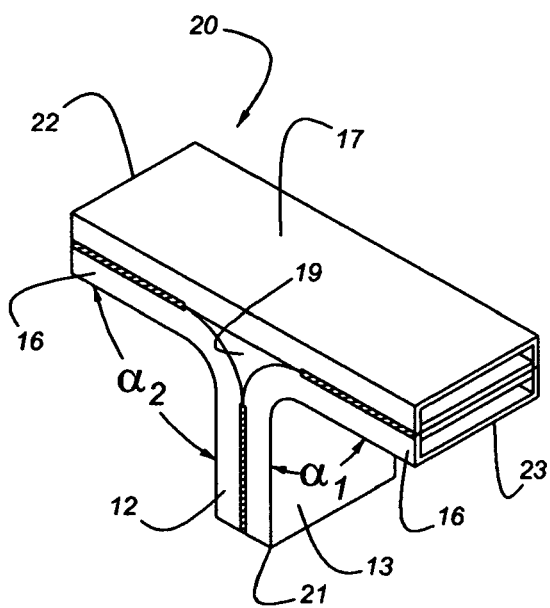
Fig. 2                    Fig. 2A

Fig. 6
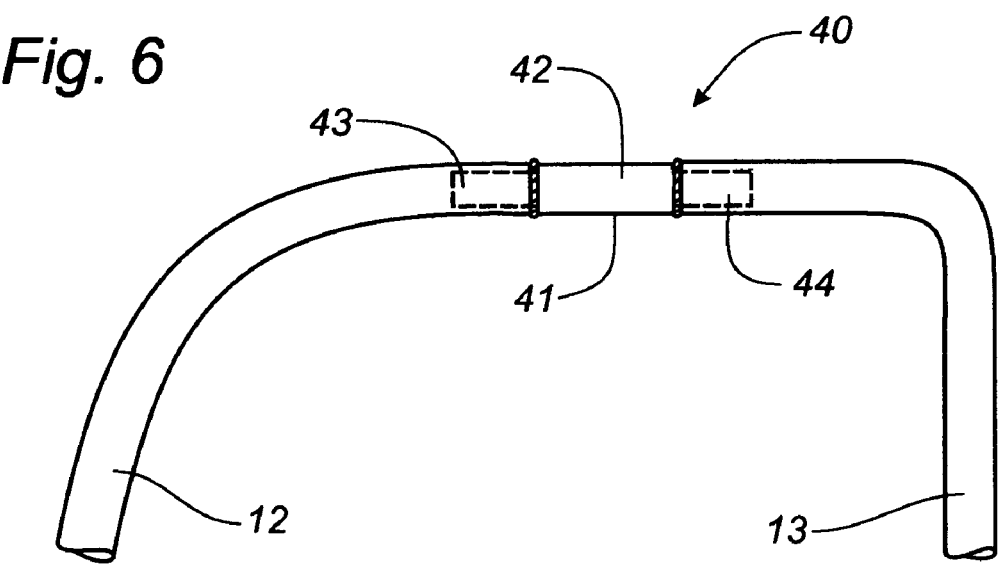
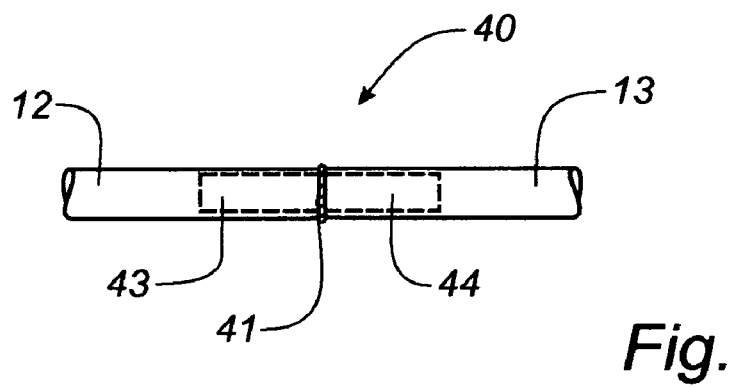
Fig. 7
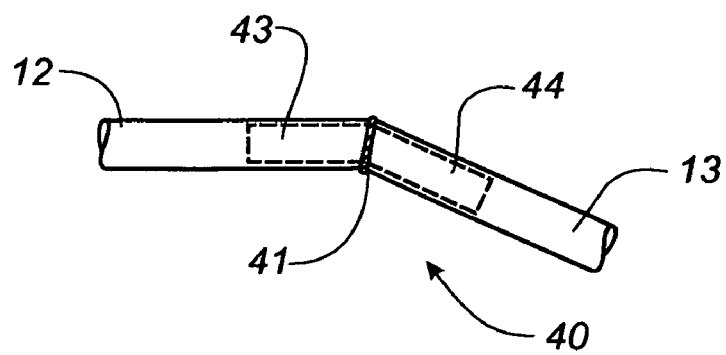
Fig. 8

UNIVERSAL STRUCTURAL JOINT FOR AUTOMOTIVE FRAMES

FIELD OF THE INVENTION

This invention relates generally to an automotive frame member and, more particularly, to a joint configuration for improving performance under crush loading.

BACKGROUND OF THE INVENTION

Federal safety requirements require vehicles to withstand loads on the vehicle roof area for occupant safety and protection. These load requirements, expressed as a percentage of vehicle weight, increase as newer Federal requirements are established. The roof load requirements are intended to simulate loads on the vehicle encountered during a vehicle rollover event. The newer, more demanding Federal requirements force countermeasures, i.e. changes to the structure of vehicle frames, which can ultimately add significant cost and weight to the vehicle. It is essential to minimize the weight of the vehicle, and thus the countermeasures adopted to meet the newer Federal safety requirements, as added weight to the vehicle frame translates into increased load requirements as the requirements are expressed in terms of a percentage of the total vehicle weight. Increasing frame size is, therefore, a "Catch 22" type of situation in that the addition of structure to meet the load requirements of the newer regulations results in increased load requirements that must be resisted by the frame structure to satisfy the Federal requirements.

One of the challenges in maintaining frame integrity to withstand the crush loads imposed on the roof structure is the formation of the joints between respective frame members. If the joints separate during crush loading, the frame will undergo collapse before the respective frame members are crushed. Accordingly, improvements in the formation of structural joints would present an opportunity for increasing the load carrying capability of the automotive frame structure.

In U.S. Pat. No. 4,618,163, granted to Franz Hasler, et al on Oct. 21, 1986, the automotive frame is formed with internesting members, including joints that are used to interconnect frame members extending in different directions. In this manner, the respective frame members are tied together by the joint members. The automotive frame in U.S. Pat. No. 4,355,844, issued to Marco Fantini Muzzarelli on Oct. 26, 1982, is made in a similar manner with joint connectors placed to engage frame members extending in different directions to tie the automotive frame together. The joint connectors are formed of three shell elements, two of which are L-shaped and the third may be formed by an independent element.

A similar space frame construction for an automotive frame is disclosed in U.S. Pat. No. 4,660,345, issued on Apr. 28, 1987, to James Browning, in which thin walled castings are welded together to form a unitary, multiple pipe juncture between series of truss or elongated structural members, forming the vehicle space frame. The space frame concept is expanded in U.S. Pat. No. 5,715,643, granted on Feb. 10, 1998, to Raymond Parkinson, in which a joining system is disclosed for joining automotive chassis members together to form a space frame structure.

It would be desirable to provide a configuration for forming a joint between frame members in an automotive frame that will improve the load carrying capability of the automotive frame.

SUMMARY OF THE INVENTION

It is an object of this invention to overcome the aforementioned disadvantages of the known prior art by providing a joint configuration for an automotive frame that increases load carrying capabilities.

It is another object of this invention to provide a universal joint construction for use in an automotive frame that can be formed in multiple leg configurations.

It is a feature of this invention that the frame members are formed into a joint in which a load imposed one frame member is shared with other frame members forming the joint.

It is an advantage of this invention that the frame members forming the joint can be bent into any angle to conform to the application of the joint in the automotive frame.

It is another advantage of this invention that the assembly of the automotive frame is made easier than previously known in the art.

It is still another advantage of this invention that the joint can withstand high loads by transferring the load from one member within the formed joint to another.

It is yet another advantage of this invention that the structural joint will not be subjected to cracks and bending when placed under load.

It is still another feature of this invention that the frame members can be formed with any cross-sectional shape, including tubular members and C-sections.

It is still another feature of this invention that the frame members can be formed with any wall thickness configuration that is constant or variable over length and cross section, and manufactured through any known process including, but not limited to, hot stamping, cold stamping, hydroforming and extrusion.

It is yet another feature of this invention that the universal joint can be utilized at substantially any joiner of automotive frame components.

It is still another feature of this invention that the frame members can be formed of substantially any material or combination of materials in the same joint.

It is yet another feature of this invention that the legs of the joint can be secured through welding or by adhesives.

It is a further object of this invention to provide a universal joint configuration for use in an automotive frame that is durable in construction, inexpensive of manufacture, carefree of maintenance, facile in assemblage, and simple and effective in use.

These and other objects, features and advantages are accomplished according to the instant invention by providing a structural joint configuration formed in an automotive frame in which the frame members are bent into an angular orientation and joined together to form a structural joint in the automotive frame in which loads imposed on any of the frame members forming the joint will be transferred to and shared with the other frame members in the joint. The structural joint can be configured with as many legs as needed to conform to the number of frame members entering the joint. The frame members can be formed with any cross-sectional shape and from any conventional material or combination of materials. Joining the frame members at the structural joint can be accomplished by any welding technology or by applying any means of adhesives. Load distribution through the frame members forming the structural joint enables the joint to withstand an application of high loads without major cracks or bending at the structural joint.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a perspective view of a joint formed according to the principles of the instant invention with three legs, the cross-sectional shape of the frame members being C-shaped channels;

FIG. 2A is a perspective view of the joint shown in FIG. 2, but utilizing tubular frame members;

FIG. 6 is a schematic elevational view of another alternative embodiment depicting a two-legged joint formed with a connector interconnecting the shaped frame members to form the joint;

FIG. 7 is a schematic elevational view of a two-legged joint configuration similar to that of FIG. 6, but utilizing a connector member that does not have an enlarged central portion; and FIG. 8 is a schematic elevational view of a two-legged joint configuration similar to that of FIG. 7, but showing an angular orientation of the shaped frame members.

DETAILED DESCRIPTION OF THE PREFERRED EMBODIMENT

Figures 1, 1A:
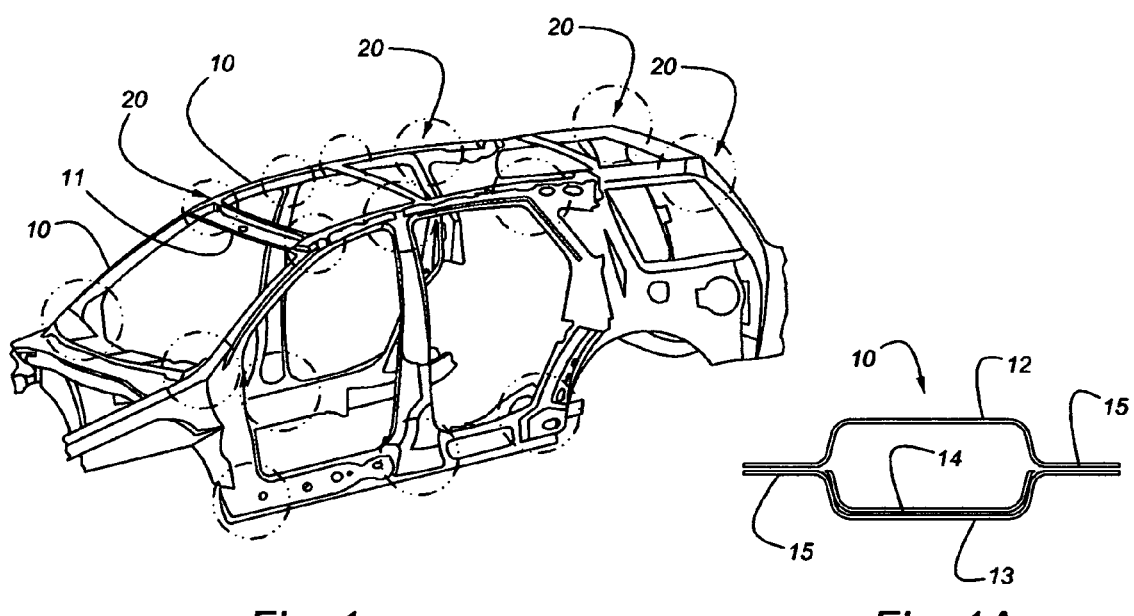
FIG. 1 is a perspective view of a conventional automotive vehicle frame highlighting the different joints that can be formed in the joint configuration incorporating the principles of the instant invention.
FIG. 1A is a cross-sectional view of a representative beam formed with hat-shaped sections.

Referring to FIGS. 1-5, a structural frame configuration for an automotive vehicle incorporating the principles of the instant invention can best be seen. Automotive frame members 10 are typically formed from a pair of shaped members 12, 13, often hat-shaped members, such as is shown in FIG. 1A, that have transversely opposed flanges 15. To beef up the frame member 10, the frame member 10 can be provided with an internal reinforcement member 14, which is typically welded to one of the members 13. The two shaped members 12, 13 can be manufactured in many different forms, including in the way of examples, hat sections, as shown in FIG. 1A; C-shaped sections, as shown in FIG. 2; rectangular cell or tubular member, as shown in FIG. 2A; half-hexagon; half-circle; arched shape; or any combination of such cross-sectional geometry known to one of ordinary skill in the art. These shaped members 12, 13 can be manufactured from any standard material including, in the way of examples, steel, aluminum, composites, nylon and magnesium, and manufactured through any known process including hot-stamping, cold stamping, hydroforming and extrusion.

The shaped frame sections 12, 13 are arranged in opposing relationship to define a cavity therebetween and a frame member 10 that has a substantial depth dimension. Joining such frame members 10 at a joint 20, as representatively shown in FIG. 1, is typically accomplished by welding, through one of known welding technologies, the frame member 10 to a separate joint member, as is reflected in the prior art documents identified above, or by welding flanges or other adjoining surfaces of the respective frame members 10. These frame members can also be manufactured with a hydroforming process that bends tubular members into required shapes and configurations.

Figure 3:
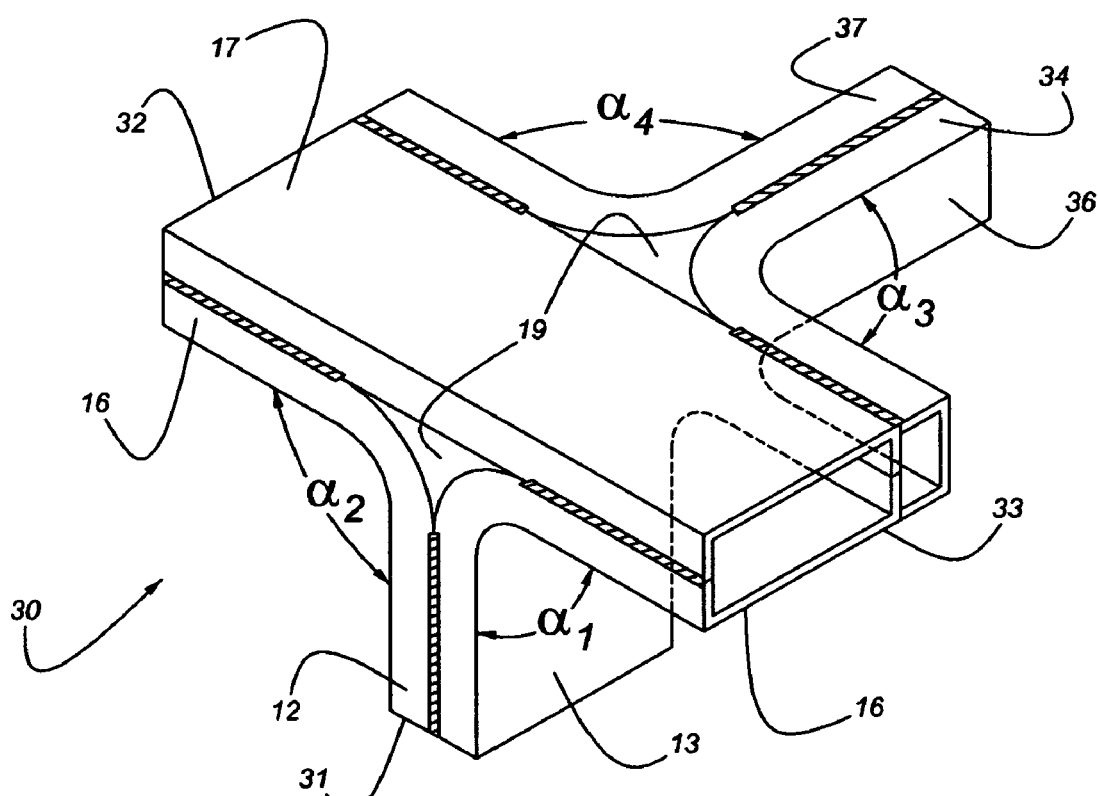
FIG. 3 is a perspective view of a joint formed according to the principles of the instant invention with four legs, the frame members being formed with C-shaped channels.
Figure 4:
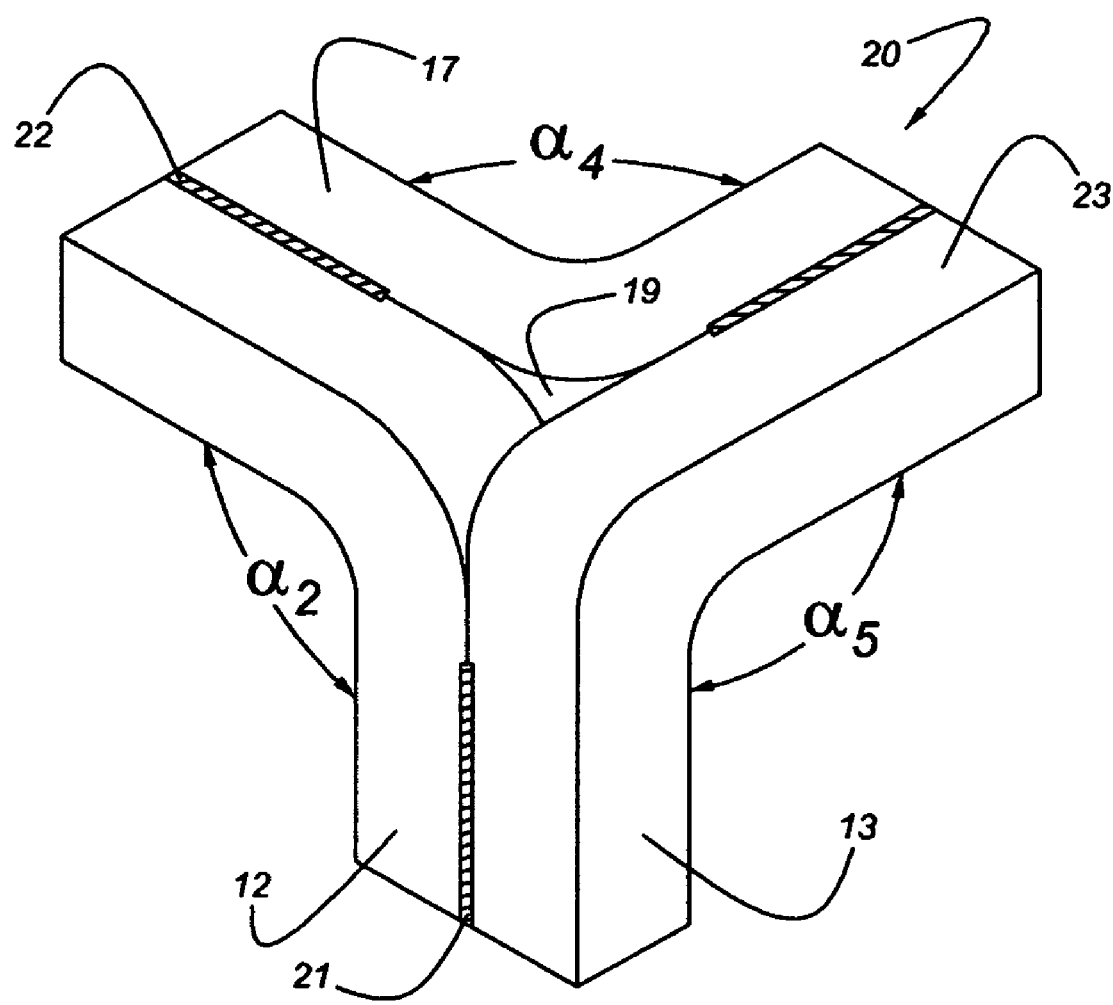
FIG. 4 is a perspective view of an alternative embodiment for a three leg joint formed with three members in a curved configuration.

As is reflected in FIGS. 2-4, the joints 20 between such formed frame members 10 can be created by dividing the two shaped members 12, 13 at the jointure 20 so that one shaped member 12 extends in one direction to merge with a corresponding shaped member 16 of a frame member 11 with which the joint 20 is to be formed, while the other shaped member is bent to extend in the opposing direction to merge with the corresponding shaped member 16 extending in the other direction from the joint 20. In this manner, the two frame members 10, 11 are merged into one integral joint 20.

Actual construction can be accomplished in anyone of several manners, but as an example, the frame member 11 can be formed with a portion of the lower shaped member 13 deleted from the frame member 11 at the location of the joint 20. The joining frame member 10 can be formed with the two shaped members divided, as depicted in FIGS. 2 and 2A, bent in opposing directions to mate with the lower shaped member 16 of the frame member 11, and welded together. Alternatively, the joint 20 could be formed as shown in FIGS. 2 and 2A, with the two shaped members 12, 13 divided from one another and bent in opposing directions, then capped with an upper shaped member 17. The formed joint 20 could then be welded to correspondingly shaped frame members that would mount to each respective leg 21-23 of the joint 20.

The angle at which the shaped members 12, 13 are bent, identified in FIGS. 2 and 2A as $\alpha_1$ and $\alpha_2$, can be any angle required to allow the legs 21-23 of the joint 20 to align with the orientation of the frame members 10, 11 corresponding to each of the legs 21-23. Furthermore, particularly with hydroforming processes, the respective legs 21-23 do not have to be formed in a common plane. Therefore, the joint 20 can be formed, bent and oriented so that the legs 21-23 can align with the frame members 10, 11 merging at the joint 20.

FIG. 2 depicts a representative schematic view of a joint 20 formed with C-shaped sections 12, 13 that are edge welded to form frame members. FIG. 2A depicts a similar configuration of the joint 20, but formed with rectangular tubing members 12, 13 that are edge welded to form the frame members 10, 11. The use of tubular members 12, 13, as shown in FIG. 2A, allows a hydroforming process to be utilized to provide a desired shape and orientation of the respective legs 21-23.

In FIG. 4, the three leg joint 20 in which the three legs extend in X Y and Z axes, as opposed to just the X and Y axes as depicted in FIGS. 2 and 2A, is formed with three members 12, 13 and 17 that are separated and bent in a manner that form the three orthogonally extending legs 21-23.

The bending of the first and second shaped members 12, 13 from the first leg into the second and third legs, along with the joining thereto of the third shaped member 17 to the bent portions of the first and second shaped members 12, 13, leaves an interstitial gap 19 at the intersection of the first, second and third shaped members 12, 13 and 17. This interstitial gap 19 can remain an empty void, but could optionally be filled with a material to minimize potential noise emanating from the gap 19. This damping material (not shown) could be substantially any material, such as a foam, or the exterior of the interstitial gap 19 could be alternatively covered by a welded plate that covers the interstitial gap 19.

Figure 5:
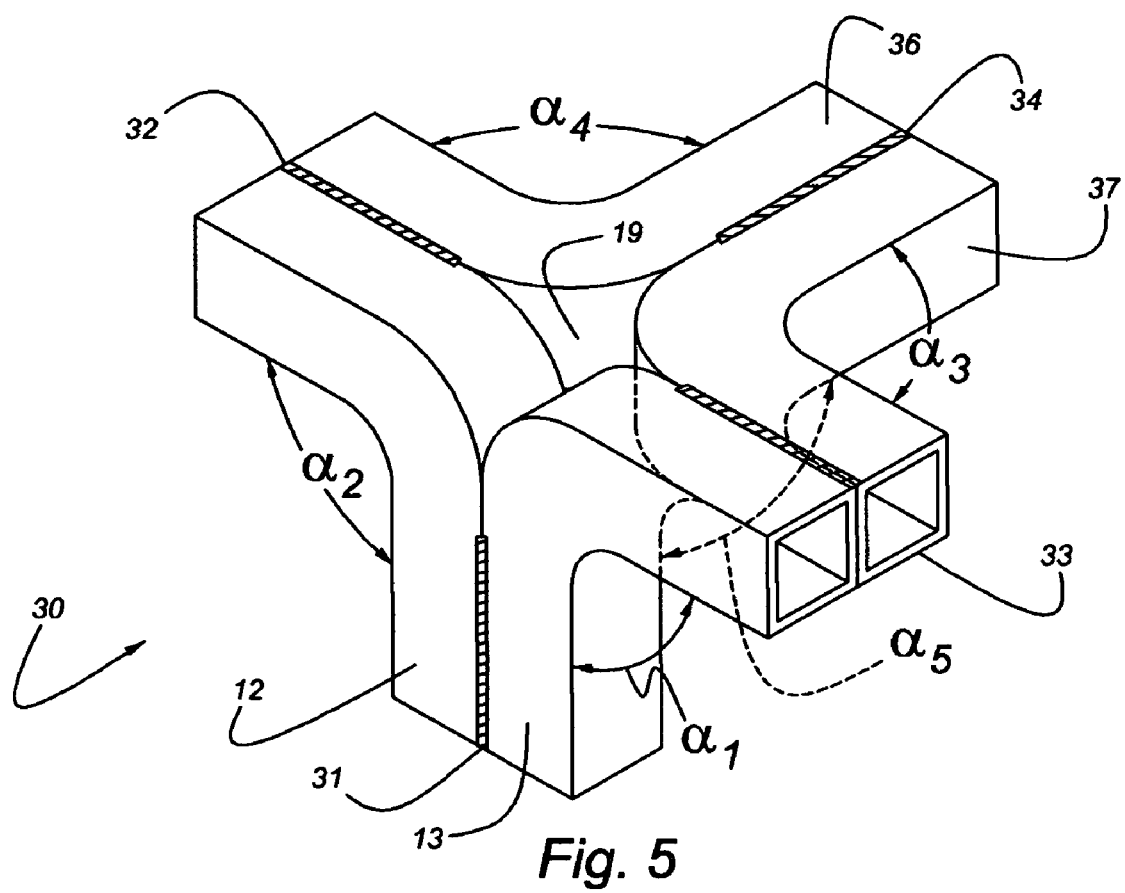
FIG. 5 is a perspective view of an alternative embodiment of a four leg joint formed with tubular members.

FIGS. 3 and 5 depict a configuration of the joint 30 in a manner that creates a joint having four legs 31-34 projecting in different directions to reflect the merger of three or four frame members at one joint 30. As noted above with respect to FIGS. 2 and 2A, the shaped members 12, 13 can be formed in any particular shape, such as the C-shaped sections shown in FIG. 3, or any of the other aforementioned shapes, or a combination of those shapes. The fourth leg 34 is formed by dividing the shaped members 36, 37 and bending them in opposing directions to mate against the adjoining legs 32, 33. Additional legs for the joint 30 can be formed in similar manners by mating against the opposite sides of the joint legs 32, 33, or across the back of the shaped member 17 spanning the legs 32, 33. As with the embodiment of FIGS. 2 and 2A, the bend angles $\alpha_1$ through $\alpha_5$ can be any particular value, as needed to form the joint 30 in a configuration that will match with the corresponding frame members aligning with the respective legs 31-34. As with the embodiment of FIGS. 2 and 2A, the interstitial gap 19 can be filled with foam or other damping material, or be covered with a plate welded to the corresponding shaped members.

In FIG. 5, the joint 30 is formed by dividing the two shaped members 12, 13 and the two shaped members 36, 37, which respectively are entering the joint 30 at angular orientations, and bending the members 12, 13, 36, 37 into an angular deflection that aligns with the corresponding opposing shaped member 12, 13, 36, 37 to form the legs 31-34. For such formed configurations, hydroforming tubular members could be the most advantageous manufacturing process.

In FIGS. 6-8, a two-legged embodiment of the instant invention can best be seen. In this two-legged joint 40, a pair of shaped frame members 12, 13 are joined together at a structural joint by a connector 41 to which the shaped frame members 12, 13 are welded after being assembled. The connector 41 can have a central portion 42 shaped uniformly with the shaped members 12, 13 to which the connector is joined, so that the welded joint as an aesthetic uniform appearance from one shaped frame member 12 to the other 13. The connector 41 has a pair of support legs 43, 44 projecting in opposing directions from the central portion 42. The support legs 43, 44 are shaped and sized to fit internally within the respective ends of the shaped frame members 12, 13 to provide support and reinforcement thereto at the joint 40. The connector 41 can be linearly or angularly formed as depicted in FIGS. 7 and 8 to mate appropriately to the orientations of the shaped frame members 12, 13 being interconnected to form the joint 40. As can be seen in the configuration of the connector 41 in FIG. 6, as compared to the configuration in FIGS. 7 and 8, the connector 41 can be formed with or without the enlarged central portion 42. The shaped frame members 12, 13 are then welded to the connector 41, as depicted in FIGS. 6-8, to form the joint 40.

While the shaped members are preferably formed of steel, as noted above, the shaped members can be formed of any appropriate material. Similarly, the preferred method of attaching shaped members together to form the joint 20, 30 is to weld the shaped members; however, other methods of attaching the shaped members to one another can be utilized as appropriate with respect to the material being used in the manufacture of the shaped members, including the use of adhesives and thermal and chemical bonding techniques.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A structural joint for connecting structural frame members in an automotive vehicle, comprising:
   a first leg formed from first and second shaped members having respective first and second identical mating dimensions joined together along a distal portion of said first leg, said first and second shaped members separating from each other above said distal portion of said first leg and being bent in different directions to define first and second bent portions, respectively; and
   a third shaped member having a third dimension identical to and mated with said first and second bent portions of said first and second shaped members, said third shaped member being joined to said first and second bent portions to form, respectively, second and third legs of said joint, which extend in three different directions for connection to corresponding structural frame members for joining said structural frame members together.

2. The structural joint of claim 1 wherein each said leg is connected to one of said structural frame members.

3. The structural joint of claim 2 wherein the joining of said third shaped member to said bent portions of said first and second shaped members occurs at respective distal ends of said second and third legs.

4. The structural joint of claim 3 wherein said first, second and third frame members are selected from the group comprising a hat-shaped section, a C-shaped section, a rectangular tubular member, a half-hexagon section, a half-circle, an arched shape, and a rectangular cell.

5. The structural joint of claim 4 wherein the respective joining of said first, second and third shaped members is accomplished by edge welding.

6. The structural joint of claim 1 further comprising:
   fourth and fifth shaped members joined together along a distal portion of a fourth leg, said fourth and fifth shaped members separating from each other above said distal portion of said fourth leg and being bent in different directions to define fourth and fifth bent portions, respectively; that are formed to mate against said third shaped member, said fourth leg extending in a direction different from said first, second and third legs to connect to another structural frame member for joining with the other structural frame members connection to said first, second and third legs.

7. The structural joint of claim 6 wherein said fourth leg is joined to a fourth structural frame member.

8. The structural joint of claim 2 wherein said first and second shaped members are extensions of corresponding shaped members forming a first structural frame member, said third shaped member and said bent portion of said first shaped member being extensions of corresponding shaped members of a second structural frame member, and said third shaped member and said bent portion of said second shaped member being extensions of corresponding shaped members of a third structural frame member.

9. In an automotive vehicle having structural frame members intersecting at structural joints, each said frame member being formed from a pair of shaped members secured together to define said structural frame member, the improvement comprising:
   said structural joint being formed from first, second and third shaped members having identical respective first and second dimensions mated together to define configurations corresponding to said shaped members of said structural frame members, said first and second shaped members being joined together at a distal end of a first leg of said joint and extending in a first direction, said first and second shaped members separating above said distal end to bend in second and third different directions to define first and second bent portions, respectively, of said first and second shaped portions, said third shaped member being formed to mate with said first and second bent portions to be joined therewith at distal ends of respective second and third legs of said structural joint, said structural joint being engaged with corresponding said structural frame members aligned in said first, second and third directions to join the corresponding said structural frame members together.

10. The automotive vehicle of claim 9 wherein said first and second shaped members are joined at said distal end of said first leg to a first structural frame member, said bent portion of said first shaped member and said third shaped member being joined at said distal end of said second leg to a second structural frame member, said bent portion of said second shaped member and said third shaped member being joined at said distal end of said third leg to a third structural frame member.

11. The automotive vehicle of claim 10 wherein said first and second shaped members are extensions of corresponding shaped members of said first structural frame member, said third shaped member and said bent portion of said first shaped member being extensions of corresponding shaped members of said second structural frame member, and said third shaped member and said bent portion of said second shaped member being extensions of corresponding shaped members of said third structural frame member.

12. The automotive vehicle of claim 10 wherein said first, second and third frame members are selected from the group comprising a hat-shaped section, a C-shaped section, a rectangular tubular member, and a half-hexagon section.

13. The automotive vehicle of claim 12 wherein an interstitial gap is formed between said first and second bent portions and said third shaped member.

14. The automotive vehicle of claim 13 wherein said interstitial gap is filled with damping material.

15. The automotive vehicle of claim 10 further comprising: fourth and fifth shaped members joined together along a distal portion of a fourth leg, said fourth and fifth shaped members separating from each other above said distal portion of said fourth leg and being bent in different directions to define fourth and fifth bent portions, respectively; that are formed to mate against said third shaped member and to be joined thereto.

16. The automotive vehicle of claim 15 wherein said fourth leg is joined at said distal portion thereof to a fourth structural frame member.

17. A method of joining structural frame members to form an automotive frame comprising the steps of:
providing first and second shaped members joined together at a distal end of a first leg of a structural joint;
separating first and second shaped members from each other above said distal end of a first leg of a structural joint;
bending said separated first and second shaped members in different directions to define first and second bent portions, respectively;
joining a third shaped member formed to mate with said first and second bent portions to said first and second bent portions to define distal ends of second and third legs of said structural joint, said first, second and third legs extending in different directions and being connected to respective structural frame members to join said structural frame members together.

18. The method of claim 17 further comprising the step of: merging said distal ends of said first, second and third legs of said structural joint with corresponding first, second and third structural frame members.

19. The method of claim 18 wherein said first and second shaped members are extensions of said first structural frame member.

20. The method of claim 17 further comprising the steps of:
providing fourth and fifth shaped members joined together at a distal end of a fourth leg of said structural joint, said fourth leg being joined with a fourth structural frame member to join the fourth structural frame member to the structural frame members joined to said first, second and third legs;
separating fourth and fifth shaped members from each other above said distal end of said fourth leg of said structural joint;
bending said separated fourth and fifth shaped members in different directions to define fourth and fifth bent portions, respectively;
joining said fourth and fifth bent portions to said third shaped member along said second and third legs of said structural joint.

* * * * *